United States Patent
Bandic et al.

(10) Patent No.: US 7,106,531 B2
(45) Date of Patent: Sep. 12, 2006

(54) METHOD OF FORMING A SERVO PATTERN ON A RIGID MAGNETIC RECORDING DISK

(75) Inventors: Zvonimir Z. Bandic, San Jose, CA (US); Ernesto E. Marinero, Saratoga, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 126 days.

(21) Appl. No.: 11/036,426

(22) Filed: Jan. 13, 2005

(65) Prior Publication Data
US 2006/0152835 A1 Jul. 13, 2006

(51) Int. Cl.
*G11B 5/86* (2006.01)
(52) U.S. Cl. ........................ 360/17
(58) Field of Classification Search ............ 360/17, 360/16, 15, 31, 59, 77.02, 78.04; 365/173
See application file for complete search history.

(56) References Cited

U.S. PATENT DOCUMENTS

| | | | |
|---|---|---|---|
| 3,869,711 A | | 3/1975 | Bernard et al. |
| 6,166,948 A | * | 12/2000 | Parkin et al. ............... 365/173 |
| 6,280,813 B1 | | 8/2001 | Carey et al. |
| 6,347,016 B1 | | 2/2002 | Ishida et al. |
| 6,433,944 B1 | | 8/2002 | Nagao et al. |
| 6,744,583 B1 | * | 6/2004 | Ikeda et al. ................ 360/59 |
| 6,791,774 B1 | * | 9/2004 | Albrecht et al. ............ 360/17 |
| 6,798,590 B1 | | 9/2004 | Albrecht et al. |
| 6,906,877 B1 | * | 6/2005 | Nishikawa et al. .......... 360/17 |
| 6,909,633 B1 | * | 6/2005 | Tsang ........................ 365/173 |
| 7,054,081 B1 | * | 5/2006 | Nishikawa et al. .......... 360/16 |
| 7,054,082 B1 | * | 5/2006 | Nishikawa et al. .......... 360/17 |
| 7,057,834 B1 | * | 6/2006 | Ishida et al. ................ 360/17 |
| 7,061,702 B1 | * | 6/2006 | Yoshimura et al. .......... 360/16 |
| 2004/0038077 A1 | | 2/2004 | Nagao et al. |

OTHER PUBLICATIONS

Ishida, T. et al., "Magnetic Printing Technology-Application to HDD", IEEE Transactions on Magnetics, vol. 39, No. 2, Mar. 2003, pp. 628-632.

* cited by examiner

Primary Examiner—Fred. F. Tzeng
(74) Attorney, Agent, or Firm—Thomas R. Berthold (57) ABSTRACT

A contact magnetic transfer (CMT) method for forming a magnetic pattern, such as the servo pattern on a magnetic recording disk, uses a master template with antiferromagnetically-coupled (AF-coupled) magnetic islands. The template is a rigid or flexible substrate with each magnetic island being two ferromagnetic films antiferromagnetically-coupled by an antiferromagnetically-coupling (AFC) film. In the presence of the applied magnetic field the magnetic moments of the two ferromagnetic films are parallel and substantially identical so they generate a magnetic field that cancels the applied field in the region of the slave disk facing the islands. However, when the applied field is removed, any residual magnetization results in the remanent moments in the two ferromagnetic films being oriented antiparallel as a result of the antiferromagnetic exchange coupling across the AFC film. Thus the islands have no net remanent magnetic moment that can affect the servo pattern transferred to the recording disk.

14 Claims, 6 Drawing Sheets

METHOD OF FORMING A SERVO PATTERN ON A RIGID MAGNETIC RECORDING DISK

RELATED APPLICATIONS

This application is related to concurrently filed application Ser. No. 11/036,503 filed Jan. 13, 2005, and titled "CONTACT MAGNETIC TRANSFER TEMPLATE HAVING MAGNETIC ISLANDS OF ANTIFERROMAGNETICALLY-COUPLED FERROMAGNETIC FILMS"

This application is also related to pending application Ser. No. 11/044,288 filed Jan. 26, 2005, and titled "METHOD FOR MAKING A CONTACT MAGNETIC TRANSFER TEMPLATE"

BACKGROUND OF THE INVENTION

1. Field of the Invention

This invention relates generally to a method of forming a servo pattern on a rigid magnetic recording disk using a contact magnetic transfer (CMT) template.

2. Description of the Related Art

Conventional magnetic recording hard disk drives use horizontal or longitudinal recording, i.e., the magnetized regions that define the magnetically recorded data bits are oriented in the plane of the recording layer on the hard disk. Perpendicular magnetic recording, wherein the magnetized regions are oriented perpendicular to the plane of the recording layer, has also been suggested for hard disk drives. Hard disk drives use fixed, pre-recorded servo patterns to position the recording heads to the desired track and record location on the disks.

Figure 1A:
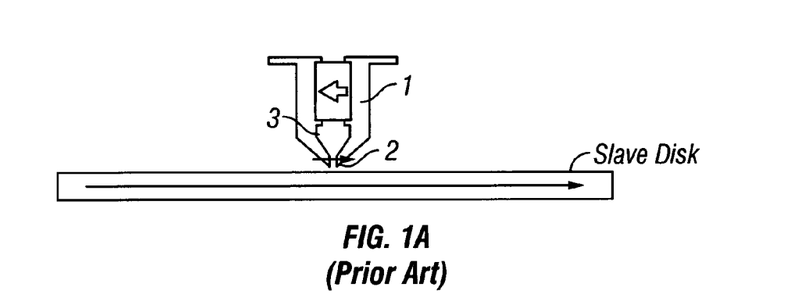
FIGS. 1A–1B depict the prior art of contact magnetic transfer on a longitudinal magnetic recording disk.
Figure 1B:
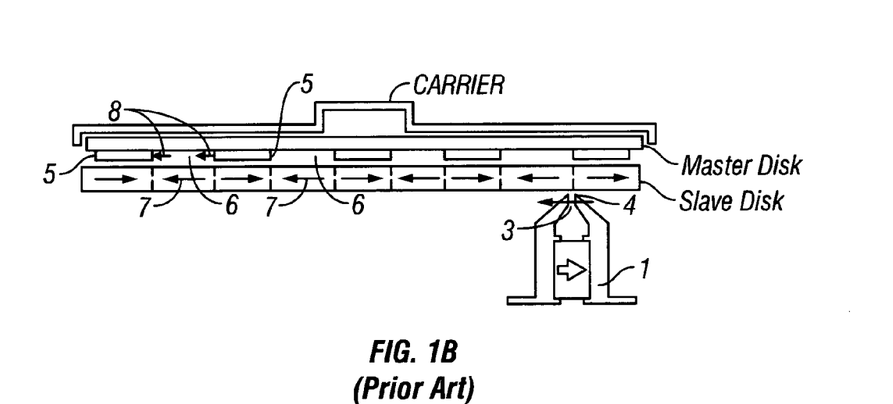

The conventional method of generating the servo pattern is by "servo-writing" the pattern on a track-by-track basis, either with a special write head and servo-writer or with the production head in the disk drive. Because this is a time-consuming and therefore expensive process, contact magnetic duplication or transfer (CMT), sometimes referred to as magnetic printing, has been proposed as a method of instantaneous recording of the servo pattern. In the CMT method a "master" disk or template is used that contains regions or islands of soft (low-coercivity) magnetic material in a pattern corresponding to the servo pattern that is to be transferred to the magnetic recording disk (the "slave" disk). As shown in FIG. 1A, the recording layer of the slave disk is first exposed to a uniform magnetic field (i.e., "DC" magnetized) with a magnet 1 that applies an in-plane horizontal (longitudinal) magnetic field in a first direction 2 across a gap 3 between the magnet's poles. This field is typically applied by rotating the slave disk past the fixed magnet 1 so that the slave disk becomes magnetized in a first circumferential direction. As shown in FIG. 1B, a master template supported on a carrier is then pressed into contact with the DC-magnetized slave disk, and a second horizontal DC magnetic field is applied by magnet 1 in the direction 4 opposite to the direction 2 of the first DC magnetization. This produces a magnetization pattern on the slave disk because the first magnetization on the slave disk is shielded from the second DC field in the regions facing magnetic islands 5 of soft magnetic material on the master template, and the first magnetization on the slave disk is reversed in the regions facing the openings 6 on the template (the nonmagnetic regions between the soft magnetic islands 5 on the master template). The reversed magnetizations are shown by arrows 7 in FIG. 1B. When the field is applied in the direction 4, the magnetic islands 5 become magnetized in the same direction 4, which generates magnetic fields that oppose the applied field in the recording layer regions facing the islands 5, so that there is essentially no field applied to the regions of the recording layer facing the islands. The magnetic field applied to the slave disk beneath the openings 6 is enhanced by the dipole fields 8 in the soft magnetic islands 5 adjacent the openings 6, because in the presence of the field from the magnet these islands generate their own fields. CMT was first proposed for generating servo patterns in longitudinal magnetic recording media in U.S. Pat. No. 3,869,711.

The CMT master template is typically a rigid substrate or a rigid substrate with a plastic film formed on it. These types of master templates have been described in U.S. Pat. Nos. 6,347,016 B1 and 6,433,944 B1; and by Ishida, T. et al., "Magnetic Printing Technology-Application to HDD", *IEEE Transactions on Magnetics*, Vol 39, No. 2, March 2003, pp 628–632. In U.S. Pat. No. 6,798,590 B2, assigned to the same assignee as this application, a flexible plastic master template is used in a CMT method that uses a differential gas pressure to press the pattern of magnetic islands against the slave disk.

The Ishida et al. paper has also suggested that the same CMT method for longitudinal magnetic recording disks, wherein a longitudinal magnetic field is applied in the plane of the recording layer as shown in FIGS. 1A–1B, can also be applied to transfer servo patterns to perpendicular magnetic recording disks. U.S. Pat. No. 6,791,774 B1, assigned to the same assignee as this application, describes a CMT template and method for forming servo patterns in perpendicular magnetic recording disks.

In the prior art CMT method, the magnetic islands on the template, which have become magnetized in the desired direction during the application of the applied magnetic field, may not revert to their demagnetized state when the applied field is removed but may retain a residual or remanent magnetization predominantly along their easy axes of magnetization. This residual magnetization of the islands may partially erase the previously transferred magnetic pattern from the slave disk, resulting in a reduction in the signal-to-noise ratio of the magnetically transferred servo pattern. This effect is more pronounced when the magnetic islands are of very small dimensions because the uniaxial magnetic anisotropy induced by the shape of the islands (shape anisotropy) causes the islands to remain magnetized.

What is needed is a CMT method that uses a template that has magnetic islands that readily saturate to produce strong magnetization in the presence of the applied magnetic field, but that exhibit virtually no remanent magnetization in the absence of the applied field.

SUMMARY OF THE INVENTION

The invention is a CMT method that uses a master template with an antiferromagnetically-coupled (AF-coupled) magnetic structure as the magnetic islands. The template is a rigid or flexible substrate with each magnetic island being two ferromagnetic films antiferromagnetically-coupled by an antiferromagnetically-coupling (AFC) film. In the presence of the applied magnetic field the magnetic moments of the two ferromagnetic films are parallel and substantially identical so they generate a magnetic field that cancels the applied field in the region of the slave disk facing the islands. However, when the applied field is removed, any residual magnetization results in the remanent moments in the two ferromagnetic films being oriented antiparallel as a result of the antiferromagnetic exchange coupling across the AFC film. Thus the islands have no net remanent magnetic moment that can affect the servo pattern transferred to the slave disk.

The ferromagnetic films are preferably formed of a soft (low coercivity) magnetic alloy of one or more of Ni, Fe and Co, but can be formed of a hard (high coercivity) magnetic alloy, like the Co alloys used for magnetic recording media, if the two ferromagnetic films have substantially the same remnant magnetic moment. If the ferromagnetic material is a NiFe alloy, then a seed layer of a CrMo alloy can be deposited on the template before the deposition of the first NiFe film. The AFC films are well-known and include Ru, chromium (Cr), rhodium (Rh), iridium (Ir), copper (Cu), and their alloys.

The CMT template has nonmagnetic regions that can be gaps or nonmagnetic material between the islands. The upper surfaces of the nonmagnetic material and magnetic islands can be contiguous and substantially coplanar to form a substantially planar continuous upper surface that contacts the slave disk.

For a fuller understanding of the nature and advantages of the present invention, reference should be made to the following detailed description taken together with the accompanying figures.

DETAILED DESCRIPTION OF THE INVENTION

Figure 2A:
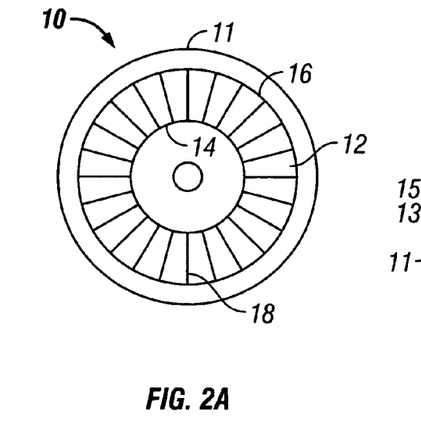
FIGS. 2A–2B are a plan view and a partial sectional view, respectively, of a hard magnetic recording disk illustrating a pattern of servo sectors extending generally radially across an annular data band.
Figure 2B:
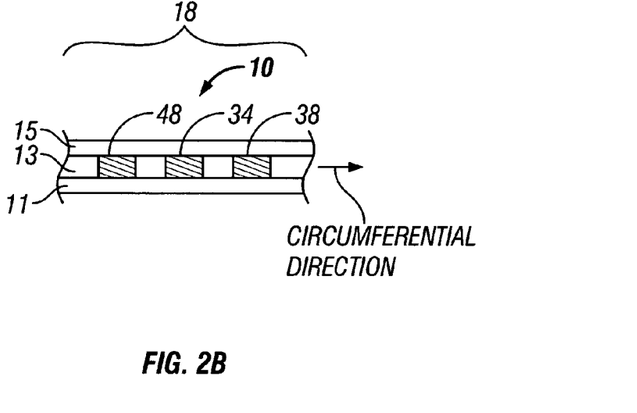

A typical example of a rigid magnetic recording disk with a servo pattern formed by contact magnetic transfer (CMT) is shown in the plan view FIG. 2A and the sectional view FIG. 2B. The magnetic recording disk 10 comprises a rigid substrate 11, a thin film metal alloy (e.g., CoPtCrB) magnetic recording layer 13 on the substrate and an outer layer 15 (e.g., a protective amorphous carbon overcoat, which typically has a lubricant, such as perfluoropolyether (PFPE), on its surface). The disk 10 has an annular data portion or band 12 which is defined by an inside diameter (ID) 14 and an outside diameter (OD) 16. The sectional view of FIG. 2B is taken along the track or circumferential direction and shows substrate 11, recording layer 13 with typical magnetized portions 48, 34, 38 making up part of the servo pattern, and outer layer 15. During operation of the disk drive, the head reads or writes data on a selected one of a number of concentric data tracks located between the ID 14 and OD 16 of the annular data band 12. To accurately read or write data from a selected track, the head is required to be maintained over the centerline of the track. Accordingly, each time one of the servo sectors, such as typical sector 18, passes beneath the head, the disk drive's head positioning control system receives servo information from the servo blocks contained within the servo sector. The information contained in the servo blocks generates a position error signal which is used by the head positioning control system to move the head towards the track centerline. Thus, during a complete rotation of the disk 10, the head is continually maintained over the track centerline by servo information from the servo blocks in successive servo sectors.

Figure 3:
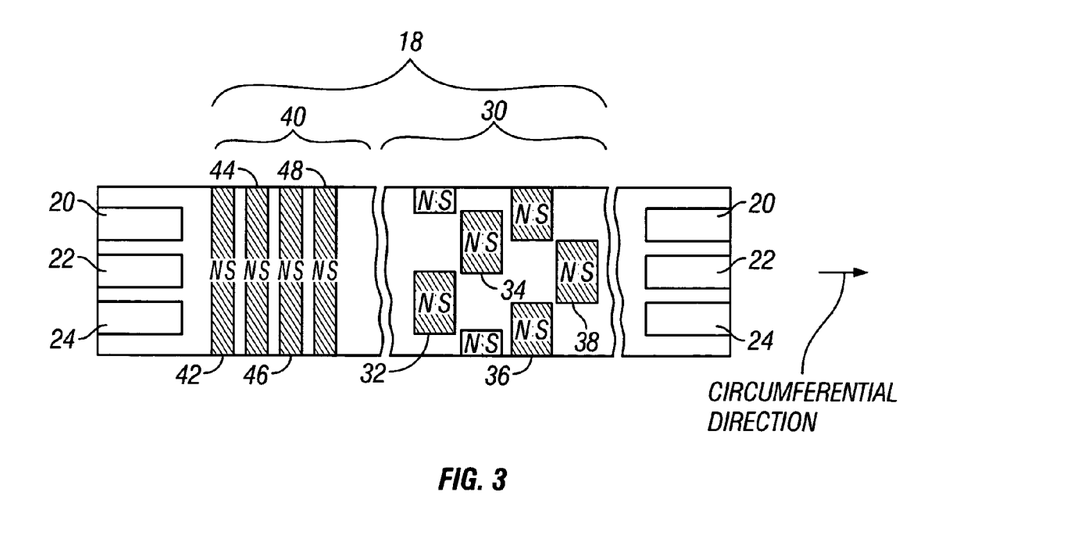
FIG. 3 is an expanded view of one of the servo sectors of FIG. 2A showing the magnetized servo regions or blocks.

An expanded top view of a typical servo sector 18 and portions of three data tracks is shown in FIG. 3. The three data tracks 20, 22, 24 are shown in outline. All of the shaded portions of FIG. 3 represent magnetized regions of the recording layer 13 that have been patterned by a CMT process. The "N" and "S" indicate the poles for each magnetized region. The non-shaded portions on FIG. 3 represent the regions of recording layer 13 that retain their magnetization from a DC magnetization process prior to the CMT process. A portion of the servo sector 18 is a servo field 30 that includes spaced-apart servo blocks, such as typical servo blocks 32, 34 and 36, 38. Also included in servo sector 18 is a field 40 of radial stripes 42, 44, 46, 48 that are used to provide synchronization and gain control for the subsequently read servo signals from servo blocks 32, 34 and 36, 38. Additional information, e.g., timing marks indicating the beginning of a servo sector and/or a coded pattern for identifying the specific servo track by track number, may also be included in servo sector 18. The servo blocks 32, 34 and 36, 38 in servo field 30 and the radial stripes 42–48 in the synchronization/gain field 40 are DC magnetized in the track or circumferential direction of the disk, as indicated by the designations "N" and "S" in FIG. 3. The servo blocks and stripes can take various shapes but typically have generally rectangular shapes. As shown in FIG. 3, the magnetization direction of the blocks and stripes is parallel to the width of the rectangles.

Figure 4:
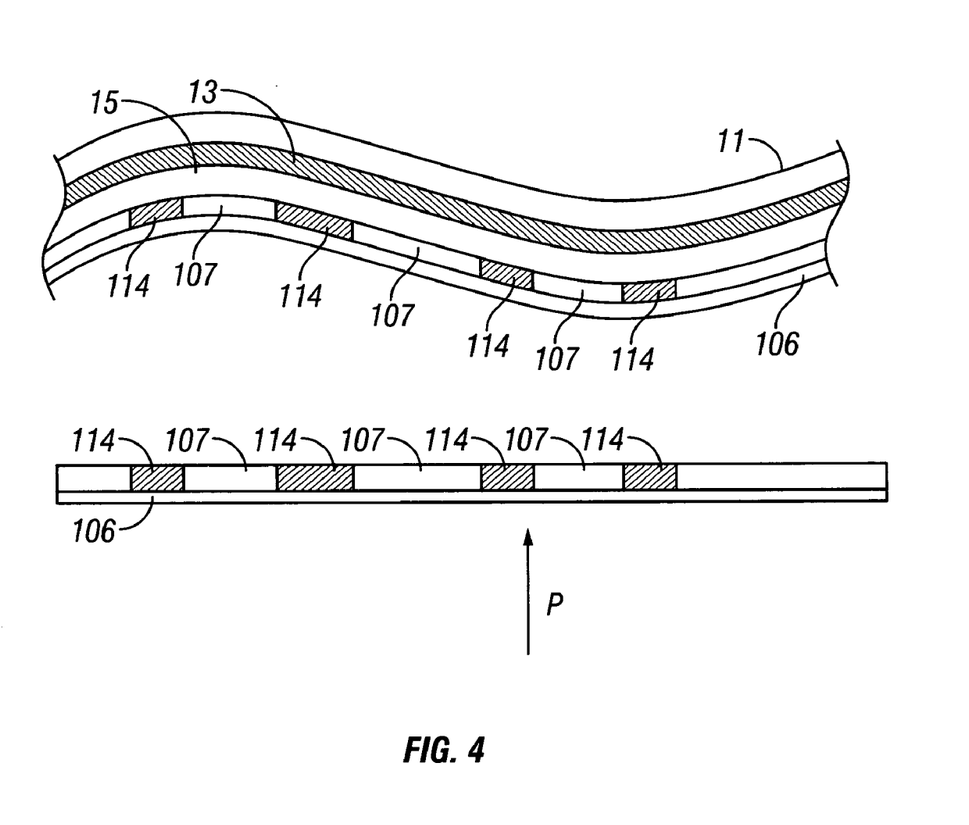
FIG. 4 is a schematic view of a CMT flexible master template positioned against the recording disk by a small differential gas pressure P.

The master disk or template depicted in FIG. 1B is a substantially rigid template comprising a rigid substrate with the magnetic islands 5 formed on it. However, the master template may be flexible to conform to the outer surface of the slave disk, which is not always perfectly planar. As shown in FIG. 4, the CMT master template may be a flexible plastic sheet 106 with magnetic islands 114. A small differential gas pressure P is applied to the flexible sheet 106 to press the islands 114 into contact with the outer surface 15 of the recording disk so that the master template generally conforms to the curvature of the recording disk.

Figure 5:
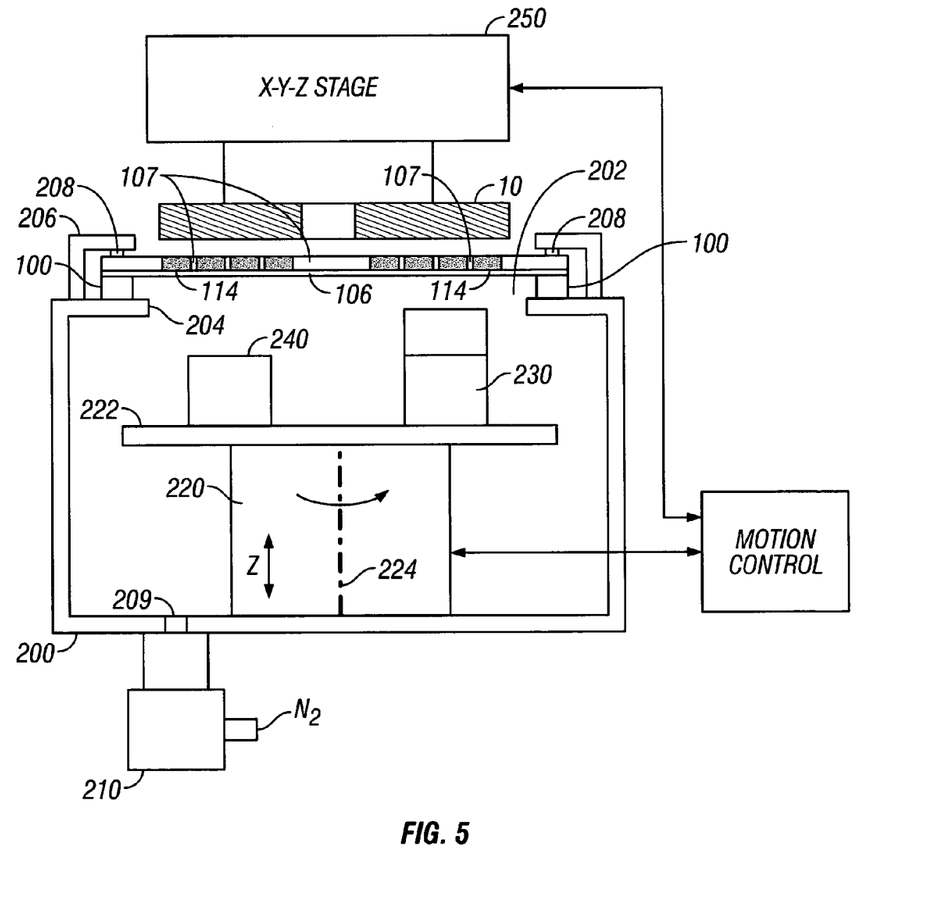
FIG. 5 is a schematic of a CMT apparatus for use with a CMT flexible master template and illustrates a template with a substantially planar upper surface formed of contiguous magnetic islands and nonmagnetic regions.

The CMT apparatus for use with the flexible master template is shown in FIG. 5 and further described in the previously cited '590 patent. A chamber 200 has an upper opening 202 with an outer periphery 204. The opening 202 is covered by the CMT master template. The CMT master template comprises a flexible plastic sheet 106 supported at its outer perimeter by a rigid substrate 100, which may be a silicon ring. The plastic sheet 106 has a pattern of magnetic islands 114 corresponding to the pattern to be transferred to the slave disk. The chamber opening 202 is sealed by clamp 206 and O-ring 208. The interior of chamber 200 has an inlet 209 connected to pressure regulator 210 which is connected to a pressurized nitrogen source. A rotation stage 220 is located inside chamber 200 and supports a platform 222 that rotates about an axis 224. A permanent magnet 230 and a counterweight 240 for magnet 230 are mounted off-axis on the platform 222. The stage 220 is also movable in the vertical Z-direction parallel to the axis 224 so that magnet 230 can be positioned at the desired distance from plastic sheet 106. The recording disk 10 to be patterned (the slave disk) is mounted on a gripper arm 250 that is movable in the X-Y-Z directions above the plastic sheet 106. The movement of the gripper arm 250 and stage 220 is controlled by a motion controller, typically a PC. The chamber 200 is pressurized to move the plastic sheet 106 with its pattern of magnetic islands 114 into contact with the slave disk 10. As the stage 220 rotates, the magnetic field from magnet 230 creates a magnetized pattern in slave disk 10 that replicates the pattern of magnetic islands 114 on the plastic sheet 106 of the CMT master template.

The CMT master template in FIGS. 4 and 5 has a continuous substantially planar upper surface formed by the magnetic islands 114 and the nonmagnetic regions 107 that are contiguous with the magnetic islands 114. The nonmagnetic regions between the magnetic islands may be formed of nonmagnetic material or may be gaps or spaces between the magnetic islands, as depicted the openings 6 in the template in FIG. 1B. A method for making a CMT flexible master template with a continuous substantially planar upper surface formed by contiguous nonmagnetic and magnetic regions is described in pending application Ser. No. 11/044, 288 filed Jan. 26, 2005, and titled "METHOD FOR MAKING A CONTACT MAGNETIC TRANSFER TEMPLATE"

In the prior art CMT master templates the magnetic regions or islands are formed of a single layer of soft magnetic material, such as $Ni_{80}Fe_{20}$ (where 80/20 represents the atomic percent of Ni/Fe). A problem may arise with the use of such templates when the recording disk (the slave disk) is removed from the template. If the slave disk is removed while the applied magnetic field is still present, the evanescent field from the magnetic islands on the template may erase the transferred magnetic servo pattern. Therefore, the slave disk should be removed only after the applied magnetic field has been turned off. This procedure will not interfere with the magnetization state of the transferred pattern provided the magnetic islands exhibit no net magnetization in the absence of the applied field. However, when the magnetic islands are of very small dimensions (typically smaller than about 100 nm), the uniaxial magnetic anisotropy induced by the shape of the islands (shape anisotropy) causes the islands to remain magnetized and therefore interfere with the transferred pattern in the recording disk. Uniaxial magnetic anisotropy of a ferromagnetic film means essentially that all of the magnetic domains tend to align along the same axis, referred to as the easy axis, which is the lowest energy state. The retained magnetization of the single-layer magnetic islands has been observed with the use of magnetic force microscopy (MFM) and shows that even for zero applied field the small $Ni_{80}Fe_{20}$ magnetic islands in the template remain magnetized in the direction of their shape anisotropy. The reason for this is that the small size of the magnetic islands does not allow a large number of magnetic domains to be formed inside each of the islands, which would otherwise mutually cancel each other and cause the island to revert to its zero magnetization state.

Figure 6A:
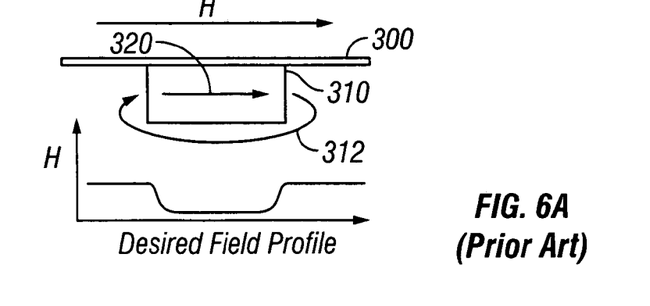
FIG. 6A is a schematic showing a prior art single-layer magnetic island exhibiting a magnetic moment in the presence of the applied field to essentially cancel the applied field in the region facing the island.
Figure 6B:
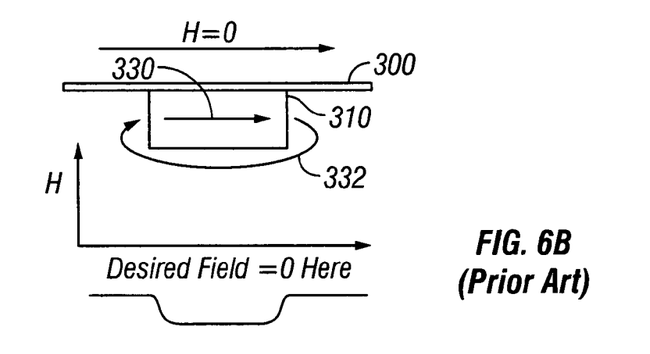
FIG. 6B is a schematic showing the magnetic island of FIG. 6A with a residual or remanent magnetic moment after removal of the applied field.

This problem of retained magnetization is depicted schematically in FIGS. 6A–6B. FIG. 6A shows a template 300 with a magnetic region or island 310 that exhibits a magnetic moment 320 in the presence of the applied field H. This moment 320 generates a magnetic field 312 that substantially cancels the applied field H in the region just below the island 310, as shown by the desired field profile in FIG. 6A. As a result, the region of the slave disk in contact with the island 310 will not be affected by the applied field H and will not have its magnetization direction changed. However, the regions of the slave disk on either side of the region in contact with island 310 will be affected by the applied field H and will have their magnetization direction reversed. FIG. 6B shows that after the applied field is removed (H=0), the island 310 retains a residual or remanent moment 330 that generates an undesirable magnetic field 332 that partially erases the desired transferred pattern in the slave disk. The moment 330 is in the direction of the easy axis of magnetization of the island 310, which corresponds to the uniaxial magnetic anisotropy induced by the shape of the island. For example, if the island has a generally rectangular shape, like the stripe 42 in FIG. 3, then the moment 330 will be along the long rectangular axis, which would be in the radial or cross-track direction. In FIG. 6B, the remanent magnetic moment 330 is depicted as being in the same direction as the previously applied field H (FIG. 6A) for ease of illustration. This would be the case if the islands had a shape with their easy axes of magnetization aligned along this direction, e.g., a rectangular shape with the length parallel to the applied field direction. However, as explained above, the more typical shape for the magnetic islands is a generally rectangular shape with the applied field H being along the width of the rectangular island. In that case the remanent magnetic moment 330 would be along the long rectangular axis of the island, i.e., into (or out of) the paper in FIG. 6B. This would apply a field orthogonal to the transferred magnetization in the recording layer and would be destructive to the transferred pattern.

Figure 7A:
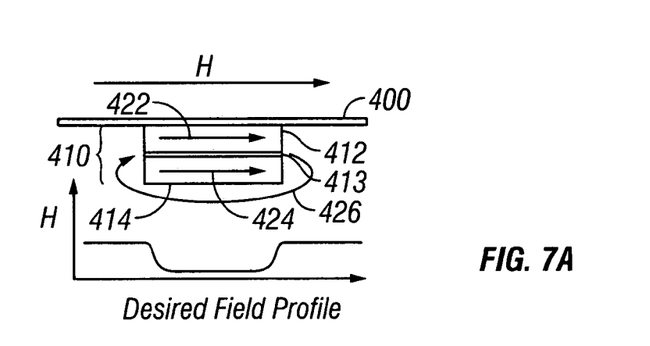
FIG. 7A is a schematic showing an AF-coupled magnetic island in a CMT master template of the present invention exhibiting a magnetic moment in the presence of the applied field to essentially cancel the applied field in the region facing the island.
Figure 7B:
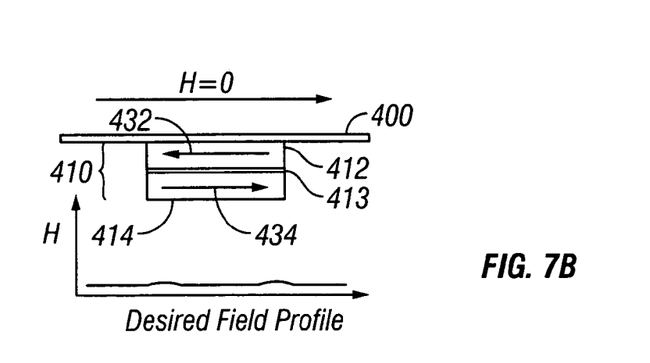
FIG. 7B is a schematic showing the magnetic island of FIG. 7A with no remanent magnetic moment after removal of the applied field.

In the present invention the magnetic islands exhibit substantially no magnetic moment when the applied field is removed (no remanent moment). As shown in FIG. 7A the template 400 has magnetic regions or islands like typical island 410. The magnetic island 410 is formed of two ferromagnetic films 412, 414 antiferromagnetically (AF) coupled across an antiferromagnetically coupling (AFC) film 413. The applied field H is greater than the antiferromagnetic exchange coupling field across AFC film 413 so that the films 412, 414 have substantially parallel moments 422, 424, respectively, in the presence of the applied field. This results in a strong net magnetization that generates a magnetic field 426 that substantially cancels the applied field H in the region below island 410. As shown in FIG. 7B, when the applied field is removed (H=0) each film 412, 414 will have a remanent magnetic moment 432, 434, respectively, along its easy axis, but the two respective moments 432, 434 will become oriented substantially antiparallel as a result of the antiferromagnetic exchange coupling across AFC film 413. Because the films 412, 414 are preferably similar in thickness and composition they will have substantially the same magnetic moment values so that the net magnetic moment of island 410 will be very small or near zero. However, the films 412, 414 can be made of different materials and/or thicknesses, with the compositions and thicknesses selected to assure substantially similar magnetic moment values. As a result, there is no remanent magnetic field that can affect the magnetic pattern transferred to the slave disk, as shown by the desired field profile in FIG. 7B. In FIG. 7B, the antiparallel remanent magnetic moments 432, 434 are depicted as being in the same direction as the previously applied field H (FIG. 7A) for ease of illustration. This would be the case if the islands had a shape with their easy axes of magnetization aligned along this direction. However, as explained above, the more typical shape for the magnetic islands is a generally rectangular shape with the applied field H being along the width of the rectangular island. In that case the antiparallel remanent magnetic moments 412, 414 would be along the long rectangular axis of the island, i.e., into (or out of) the paper in FIG. 7B.

The structure of the magnetic islands 410 is based on the phenomenon of antiferromagnetic coupling of ferromagnetic films via a nonferromagnetic transition metal spacer film (the AFC film), which has been extensively studied and described in the literature. In general, the exchange coupling oscillates from ferromagnetic to antiferromagnetic with increasing spacer layer thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990). The material combinations include ferromagnetic films made of Co, Fe, Ni, and their alloys and AFC films such as ruthenium (Ru), chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer film is selected to assure antiferromagnetic coupling between the two ferromagnetic films. The period of oscillation depends on the nonferromagnetic spacer material, but the strength and phase of the oscillatory coupling also depends on the ferromagnetic material and interfacial quality. The phenomenon of antiferromagnetic coupling of ferromagnetic films via an AFC film is used in many magnetic structures in hard disk drives, including giant magnetoresistive (GMR) read heads and magnetic recording disks. U.S. Pat. No. 6,280,813, assigned to the same assignee as this application, describes AF-coupled magnetic recording media (commonly called AFC media) that is used in virtually all current hard disk drives.

The advantage of the CMT template with AF-coupled films of NiFe alloy soft magnetic material as the magnetic islands was successfully demonstrated in test structures formed by first depositing $Cr_{80}Mo_{20}$ seed layers onto rigid substrates by ion beam deposition (IBD). The $Cr_{80}Mo_{20}$ seed layer facilitates the in-plane orientation of the magnetization in the ferromagnetic films. Other seed layers include Cr, CrMoB, CrW and CrMn. Next, a first $Ni_{80}Fe_{20}$ film, a Ru AFC film, and a second $Ni_{80}Fe_{20}$ film were sequentially deposited by IBD, with films of different thicknesses being deposited to form the various test structures. Typical thicknesses for the $Ni_{80}Fe_{20}$ films were in the range of approximately 10 to 40 nm, and typical thicknesses for the Ru AFC films were in the range of approximately 0.5 to 0.9 nm. The magnetic material for the ferromagnetic films is preferably any high-moment, soft (relatively low coercivity) magnetic material, such as NiFe(80/20) used in the test structures. Other examples of magnetic material include NiFe(30/70), NiFe(55/45), NiFeCo(35/12/53), FeCo(62/38), $Co_xPt_{(100-x)}$ (x=82 to 70) and other alloys of Ni, Fe and/or Co. These ferromagnetic alloys may also include one or more other elements, such as Pt, Pd, Ta, Ti, W and Cr. While the preferred material for the ferromagnetic films is a soft magnetic material that has essentially no remanent magnetic moment, hard or relatively high coercivity ferromagnetic materials, such as CoPtCr alloys and other alloys used in magnetic recording media, may be used provided the AF-coupled structure is fabricated so that the two ferromagnetic films have substantially the same remanent magnetic moment. The magnetic material layer can be deposited by evaporation or electroplating or other known processes, but the preferred process is by IBD. The AFC films may be formed of other materials besides Ru, such as Cr, Rh, Ir, Cu and their alloys. While the test structures used a rigid substrate, the magnetic islands comprising the AF-coupled structure can be formed on flexible plastic substrates, such as polyimide.

Figure 8:
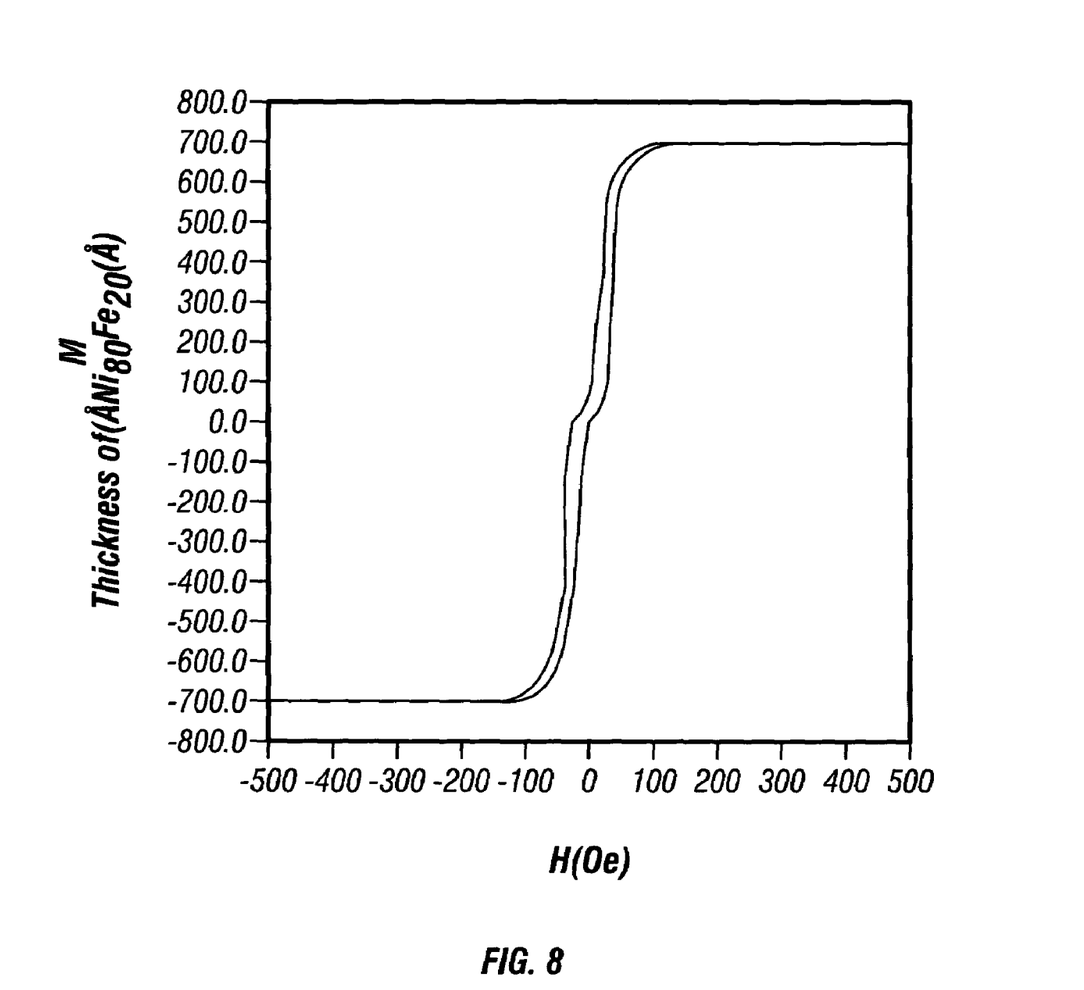
FIG. 8 is a M-H magnetization curve of a $Ni_{80}Fe_{20}$(30 nm)/Ru(0.8 nm)/$Ni_{80}Fe_{20}$(30 nm) AF-coupled structure like the structure used for the magnetic islands in the CMT master template of this invention.

FIG. 8 shows the magnetization curve (magnetic moment vs applied field) of a $Ni_{80}Fe_{20}$(35 nm)/Ru(0.8 nm)/$Ni_{80}Fe_{20}$ (35 nm) AF-coupled structure measured by vibrating sample magnetometer (VSM). The moment (y-axis) is calibrated with a $Ni_{80}Fe_{20}$ standard and is expressed in terms of the thickness of $Ni_{80}Fe_{20}$ (in Angstroms) that produces the magnitude of the measured moment. It can be seen from the M-H hysteresis curve that at H=0, the remanent magnetization is significantly reduced by virtue of the antiferromagnetic exchange coupling of the two ferromagnetic films. The equivalent moment at H=0 would correspond to a film whose total thickness is approximately 7 nm, whereas in saturation, as seen in the figure, the equivalent moment derived corresponds to the film total thickness of 70 nm. In addition, it can be seen that saturation magnetization of the AF-coupled structure is achieved for an applied field of approximately 100 Oe. The measurement indicates that the ratio of the saturation magnetization to the remanent magnetization is approximately 10. Similar AF-coupled structures, but with 15 nm thick $Ni_{80}Fe_{20}$ layers, yielded a ratio of the saturation magnetization to the remanent magnetization of approximately 30. Larger ratios can be produced by judicious adjustment of the layer thicknesses in the AFC structure.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method of forming a pattern of magnetized regions in the magnetic recording layer of a rigid magnetic recording disk comprising:
    providing a magnetic recording disk comprising a rigid substrate and a magnetic recording layer on the substrate having an annular portion magnetized in the plane of the recording layer in a first circular direction;
    providing a substantially planar master template having a plurality of magnetic islands, each island comprising first and second ferromagnetic films separated by an antiferromagnetically coupling (AFC) film;
    positioning the recording disk in contact with the template with the recording layer facing the islands on the template, each island thereby facing an adjacent recording layer region;

applying an external magnetic field substantially in the plane of the recording layer in a direction opposite to said first direction to thereby orient the magnetization directions of the first and second ferromagnetic films in each island to be substantially parallel to one another and to the applied field, whereby each island generates a magnetic field that substantially opposes the applied field in its adjacent recording layer region;

moving the external magnetic field around the disk to reverse the magnetization direction of the regions of the recording layer between the regions of the recording layer facing the islands; and removing the external magnetic field, thereby allowing residual magnetization in the first ferromagnetic films to be oriented antiparallel to residual magnetization in the second ferromagnetic films in the islands as a result of antiferromagnetic coupling across the AFC films, whereby the magnetic islands have essentially no net magnetic moment following removal of the external magnetic field.

2. The method of claim 1 wherein providing a template comprises providing the first and second ferromagnetic films of an alloy of one or more of Ni, Fe and Co.

3. The method of claim 1 wherein providing a template further comprises providing the first and second ferromagnetic films of an alloy consisting essentially of Ni and Fe and providing a seed layer selected from the group consisting of Cr, a CrMo alloy, a CrMoB alloy, a CrMn alloy and a CrW alloy on the template before providing the first and second ferromagnetic films on the template.

4. The method of claim 1 wherein providing a template comprises providing the first and second ferromagnetic films of an alloy comprising (a) one or more of Ni, Fe and Co and (b) one or more elements selected from the group consisting of Pt, Pd, Ta, Ti, W and Cr.

5. The method of claim 1 wherein providing a template comprises providing the AFC film of a material selected from the group consisting of ruthenium (Ru), chromium (Cr), rhodium (Rh), iridium (Ir), copper (Cu), and their alloys.

6. The method of claim 1 wherein providing a template further comprises providing a template having a plurality of nonmagnetic regions between the magnetic islands, the nonmagnetic regions and magnetic islands being substantially contiguous and the upper surfaces of the nonmagnetic regions and magnetic islands forming a continuous substantially planar surface.

7. The method of claim 1 wherein providing a template comprises providing a flexible sheet and wherein positioning the recording disk in contact with the template comprises applying a differential gas pressure to the flexible sheet to press the islands against the recording disk.

8. A method of forming a pattern of magnetized regions in the magnetic recording layer of a rigid magnetic recording disk comprising:

providing a magnetic recording disk comprising a rigid substrate and a magnetic recording layer on the substrate having an annular portion magnetized in the plane of the recording layer in a first circular direction;

providing a flexible plastic template having a plurality of magnetic islands, each of said plurality of magnetic islands having a generally rectangular shape with a width and length each less than approximately 100 nm and comprising first and second ferromagnetic films separated by an antiferromagnetically coupling (AFC) film;

applying a differential gas pressure to the flexible template to press the islands against the recording disk, each island thereby facing an adjacent recording layer region;

applying an external magnetic field substantially in the plane of the recording layer in a direction opposite to said first direction to thereby orient the magnetization directions of the first and second ferromagnetic films in each island to be substantially parallel to one another and to the applied field, whereby each island generates a magnetic field that substantially opposes the applied field in its adjacent recording layer region;

moving the external magnetic field around the disk to reverse the magnetization direction of the regions of the recording layer between the regions of the recording layer facing the islands; and removing the external magnetic field, thereby allowing residual magnetization in the first ferromagnetic films to be oriented antiparallel to residual magnetization in the second ferromagnetic films in the islands as a result of antiferromagnetic coupling across the AFC films, whereby the magnetic islands have essentially no net magnetic moment following removal of the external magnetic field.

9. The method of claim 8 wherein providing a template comprises providing the first and second ferromagnetic films of an alloy of one or more of Ni, Fe and Co.

10. The method of claim 8 wherein providing a template further comprises providing the first and second ferromagnetic films of an alloy consisting essentially of Ni and Fe and providing a seed layer selected from the group consisting of Cr, a CrMo alloy, a CrMoB alloy, a CrMn alloy and a CrW alloy on the template.

11. The method of claim 8 wherein providing a template comprises providing the first and second ferromagnetic films of an alloy comprising (a) one or more of Ni, Fe and Co and (b) one or more elements selected from the group consisting of Pt, Pd, Ta, Ti, W and Cr.

12. The method of claim 8 wherein providing a template comprises providing the AFC film of a material selected from the group consisting of ruthenium (Ru), chromium (Cr), rhodium (Rh), iridium (Ir), copper (Cu), and their alloys.

13. The method of claim 8 wherein providing a template further comprises providing a flexible plastic template having a plurality of nonmagnetic regions between the magnetic islands, the nonmagnetic regions and magnetic islands being substantially contiguous and the upper surfaces of the nonmagnetic regions and magnetic islands forming a continuous substantially planar surface.

14. The method of claim 13 wherein applying a differential gas pressure to the flexible template comprises pressing the nonmagnetic regions against the recording disk, each nonmagnetic region facing an adjacent recording layer region between the recording layer regions facing the islands.

* * * * *